United States Patent [19]

Linsinger

[11] 4,018,134

[45] Apr. 19, 1977

[54] APPARATUS FOR TRIMMING AND EDGE-CUTTING A PLATE-LIKE METALLIC WORKPIECE

[76] Inventor: Ernst Linsinger, Steyrermuhl, Austria

[22] Filed: Aug. 18, 1975

[21] Appl. No.: 605,304

Related U.S. Application Data

[62] Division of Ser. No. 400,266, Sept. 24, 1973, Pat. No. 3,922,951.

[52] U.S. Cl. .................................... 90/15 R; 51/35

[51] Int. Cl.² ........................ B23C 3/12; B24B 9/04

[58] Field of Search ............... 90/11 R, 15 R, 12 D, 90/24 D, 24 F, DIG. 2, 38 R, 38 A, 41, 42, ; 51/35, 60

[56] References Cited

UNITED STATES PATENTS

| | | | |
|---|---|---|---|
| 3,762,273 | 10/1973 | Sprung | 90/15 R |
| 3,788,174 | 1/1974 | Morse et al. | 83/360 X |

FOREIGN PATENTS OR APPLICATIONS

| | | | |
|---|---|---|---|
| 308,400 | 1/1918 | Germany | 90/42 |
| 1,253,014 | 10/1967 | Germany | 90/15 R |
| 44-3954 | 5/1966 | Japan | 83/360 |

*Primary Examiner*—Othell M. Simpson
*Assistant Examiner*—Z. R. Bilinsky
*Attorney, Agent, or Firm*—Kurt Kelman

[57] ABSTRACT

An apparatus for trimming and profiling the edges of a metal plate comprises a table supporting the plate and at least one milling cutter unit guided laterally and parallel to a respective plate edge by at least two straight guide tracks for the milling cutter units. The guide tracks extend at right angles to each other and parallel to the plane of the plate. The milling cutter unit includes a milling cutter rotatable about an axis which is perpendicular to this plane.

6 Claims, 11 Drawing Figures

33
34
30
42
41
38
35
39
43
36
2b
29
2a
40
37

APPARATUS FOR TRIMMING AND EDGE-CUTTING A PLATE-LIKE METALLIC WORKPIECE

This is a division of application Ser. No. 400,266, filed Sept. 24, 1973, now U.S. patent No. 3,922,951, dated Dec. 2, 1975.

The present invention relates to improvements in an apparatus for trimming and edge-cutting a plate-like metallic workpiece, and more particularly to the type of apparatus which comprises a table for supporting the workpiece and at least one milling cutter unit guided laterally of, and parallel to, a respective edge of the workpiece. The cutter unit includes a milling cutter rotatable about an axis which is perpendicular to the plan of the workpiece.

Before metal sheets or plates are processed, e.g., by welding, they must not only be trimmed to a predetermined size but their edges, which are butt welded to each other, for instance, must be squared or cut at an oblique angle to the face or plane of the workpiece. For this purpose, the edges are planed or milled.

In most known milling machines, a milling cutter unit is used for this purpose. Such a unit comprises a milling cutter which rotates about an axis perpendicular to the plane of the workpiece and is guided along a track which is laterally parallel to the workpiece edge to be milled. If more than one workpiece edge is to be milled, the workpiece must be turned, newly aligned and again fixed in position, which requires an additional complicated operation. Besides, such machines cannot readily be used for work on long workpieces because this would require a support table consisting of two parts extending at right angles to each other and each dimensioned for the largest size of workpiece being milled.

It is the primary object of this invention to provide an apparatus of the first-described type which makes it possible to machine mutually perpendicular edges of long metallic workpieces in a simple manner and with a minimum of labor, eliminating the need for time-consuming turning of the workpiece, realigning and renewed clamping of the realigned workpiece on the support table.

This and other objects are accomplished in accordance with the invention by providing at least two straight guide tracks for the milling cutter unit or units, the guide tracks extending at right angles to each other and parallel to the plane of the workpiece.

Such an arrangement makes it possible to do precision trimming and profiling of two mutually perpendicular edges of a metal sheet or plate while the same remains clamped in place on the support table so that the workpiece needs to be turned only once if all four edges are to be milled. The previously milled edges may then be used as reference edges to assure accurate squaring of the workpiece without the need for complicated realignment thereof.

In one preferred labor saving embodiment, a single milling cutter unit is guided by such guide tracks which extend in one plane, and a turntable interconnects the guide tracks so that the single milling cutter unit may be switched from one track to the next for working on respective workpiece edges, i.e., on all edges if four guide tracks are provided.

Even faster work and increased output is obtained with another embodiment wherein two intersecting guide tracks extending in one plane each guides one milling cutter unit, and a turning switch is provided at the point of intersection of the guide tracks, which enables the units to be guided without interference at this point.

The above and other objects, advantages and features of the present invention will become more apparent from the following detailed description of certain now preferred embodiments thereof, taken in conjunction with the accompanying drawing wherein FIG. 1 is a diagrammatic side elevational view of one embodiment of an apparatus according to this invention;

Figure 1:
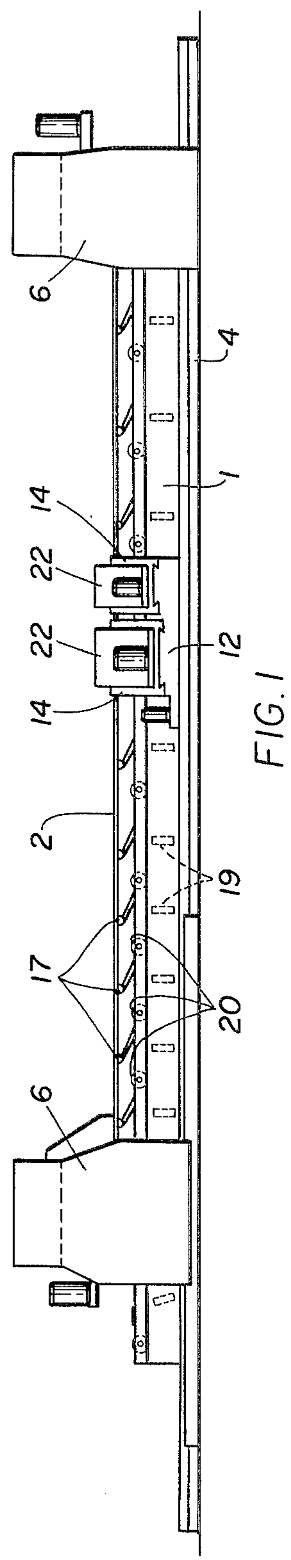
Figure 2:
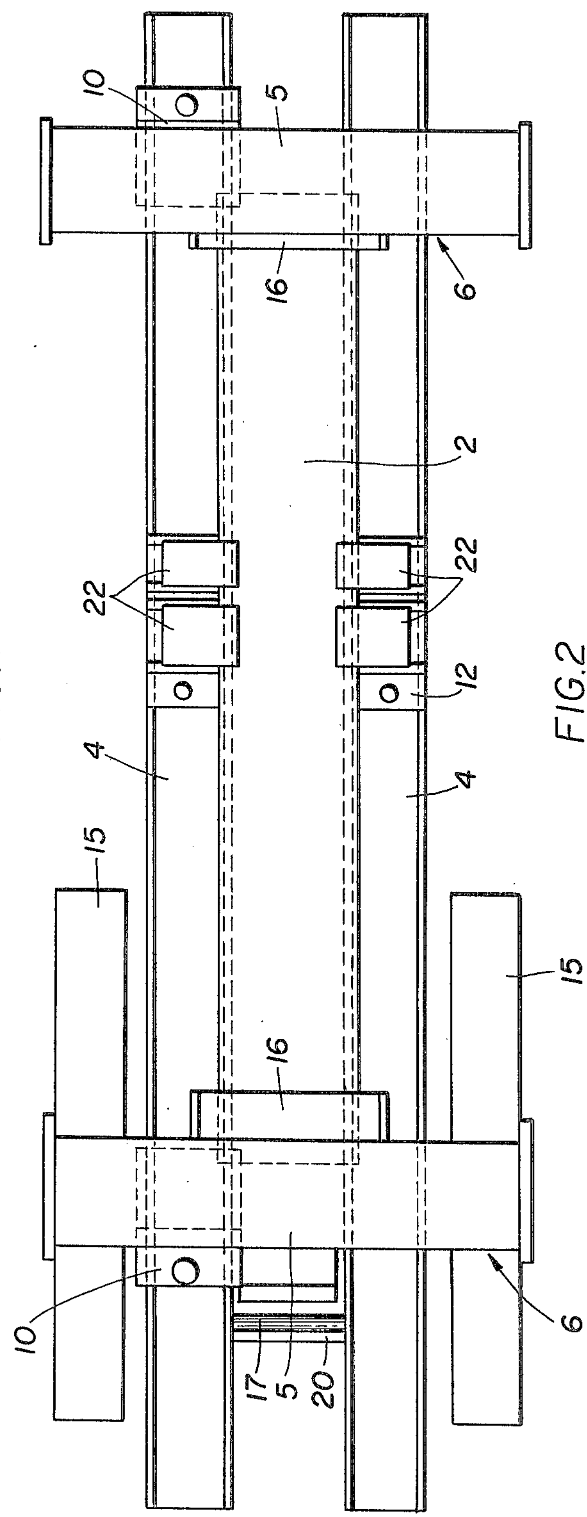
FIG. 2 is a top plan view thereof.
Figure 3:
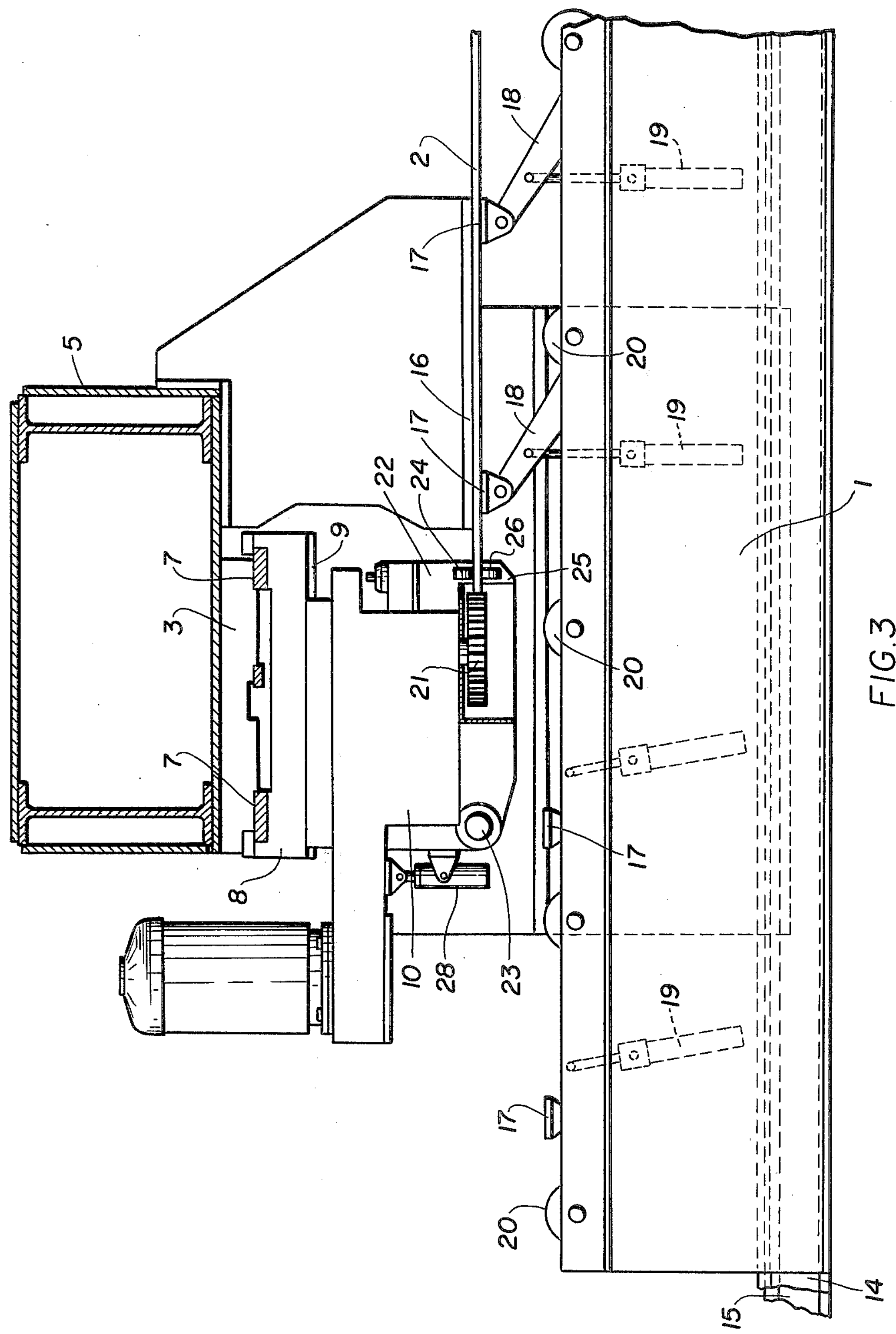
FIG. 3 is an enlarged view, partly in section of a milling cutter unit guided on a portal.

Referring now to the drawing and first to FIGS. 1 to 4, the apparatus therein illustrated comprises a base or table 1 for supporting plate-like metallic workpiece 2. Four tracks 3, 3 and 4, 4 surround the workpiece, each track being parallel to a respective edge of the workpiece and to the major face of the workpiece. As shown in FIG. 3, tracks 3 are secured to the underside of beams 5 of portals 6 which span the workpiece in the direction of its width. These tracks are shown to consist of crossbeams carrying guide rails 7. Carriage 8 is suspended from guide rails 7 and provides a track 9 extending transversely of track 3 and guiding sliding carrier 10 for the milling cutter unit.

Figure 4:
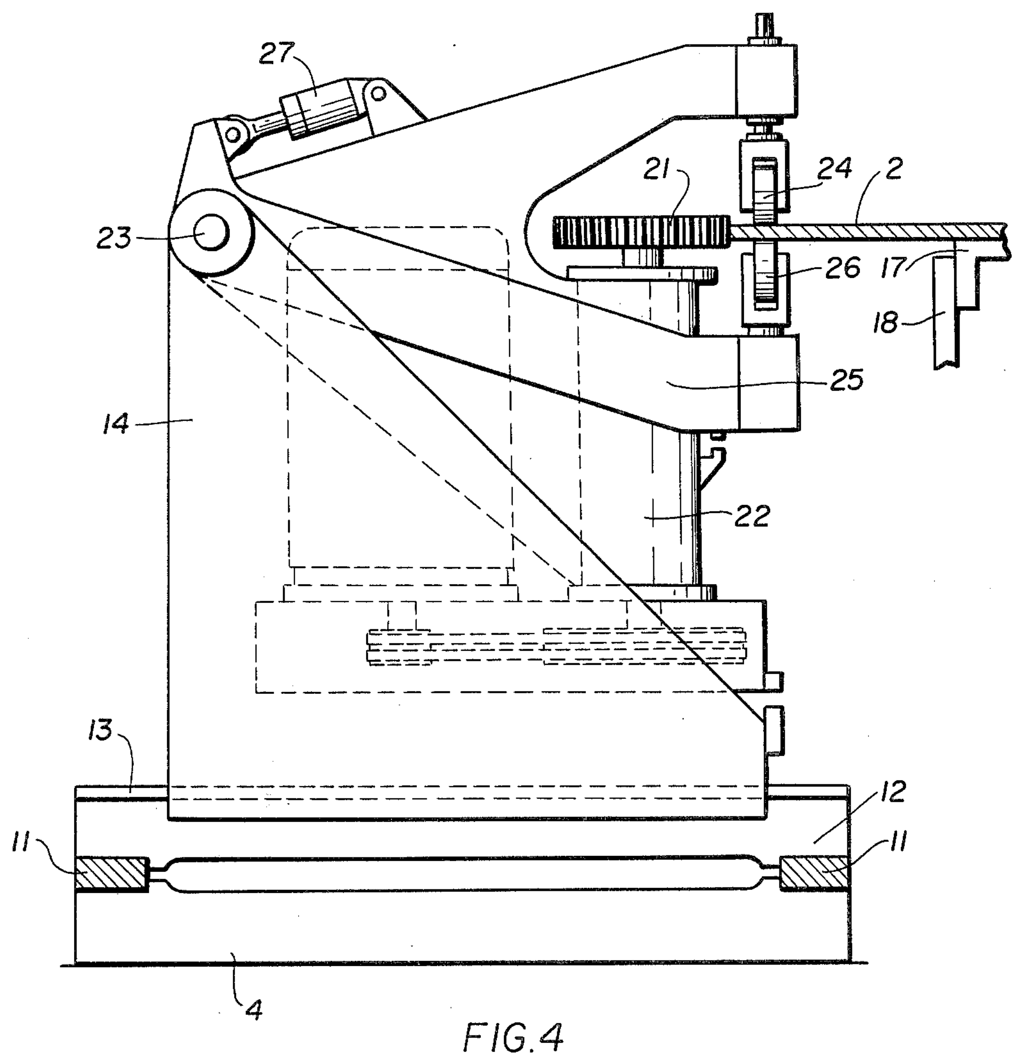
FIG. 4 is an enlarged elevational view, partly in section, of a milling cutter unit guided along the support table.

As shown in FIG. 4, tracks 4 associated with the length sides of the table have two guide rails 11 on which slidable carriage 12 is displaceably mounted. This carriage has dovetail-shaped guides 13 extending transversely to track 4 and guiding sliding carrier 14.

In this illustrated embodiment, the pairs of guide tracks 3, 3 and 4, 4 extend in two different planes parallel to, and above, the plane of the workpiece, the milling cutters of the units protruding downwardly therefrom. Portals 6, which span the width of the table, support the guide tracks extending in the direction of the width sides of the table, one of the portals being fixedly connected to the table and the other portal being displaceable in the direction of the length sides of the table along track 15. This structure makes it possible to work on all four narrow edges of the workpiece simultaneously and with great precision, cutting the work time to a minimum while assuring high precision in trimming and edge-cutting the workpiece. Because of the arrangement of the respective pairs of guide tracks on different levels, the guide tracks do not interfere with each other at the corners. the movability of at least one of the portals adapts this embodiment readily to work on sheets of different dimensions.

In the illustrated preferred embodiment, only one of the portals is displaceable lengthwise, while the other portal is stationary, which has the advantage of constituting the stationary portal as a head station of ready alignment of the workpiece.

Portals 6 carry backing plates or abutments 16 attached to the portals by webs, and the workpiece is clamped in position on the table by supports 17 mounted on the table by links 18 which may be raised by hydraulic jacks 19 for pressing the workpiece against the backing plates.

Mounting of two guide tracks on portals spanning the width of table 1 has the advantage of making it possible to provide a roller conveyor for transporting the workpiece through at least one of the portals. Such a conveyor makes it possible to dispense with the complicated transport of the workpiece by crane and thus enable a continuous operation of the machine.

As shown, the support table carries roller conveyor 20 which enables the workpiece to be transported to and from the table through displaceable portal 6 until it has reached the stationary portal against which it abuts. The hydraulic jacks 19 are now operated to raise supports 17 whereon the workpiece rests out of the transport plane against the abutments 16 in which clamped position the workpiece is then trimmed and milled.

To preclude damage to the milling cutter units carried on the portals and to the supports, means is provided for stopping operation of the hydraulic jacks or to lower them when the displaceable portal is moved over the supports so that the downwardly protruding milling cutter 21 may be applied to the edge of the workpiece without obstruction.

The hydraulic jack drives also have stroke-limiting means to ensure that the workpiece will be supported in a plane in its working position. Their use, however, may prevent the application of sufficient clamping force against abutment 16. To eliminate this disadvantage, the stroke-limiting means may be rendered inoperative in the range of the portals. No stroke-limiting means need be arranged at all in the range of the stationary portal.

As is particularly apparent from FIG. 4, housing 22 for the milling cutter unit is pivoted to sliding carrier 14 on pivot 23 about a fulcrum axis parallel to the edge of the workpiece, and the unit is supported on workpiece 2 by means of guide rollers 24 rolling on the surface of the workpiece. Rocking arm 25 is also pivotal on pivot 23 and carries guide rollers 26 running on the underside of the workpiece. Hydraulic jack 27 enables milling cutter housing 22 to be pivoted towards rocker arm 25 so that workpiece 2 is held between rollers 24 and 26 as between jaws. This arrangement permits the milling to proceed while holding the workpiece very steadily and without vibrations between milling cutter 21 and workpiece 2.

As shown in FIG. 3, sliding carrier 10 also has pivoted thereto a milling cutter housing 22, the like reference numerals designating like parts operating in a like manner, i.e., the structure and operation of the milling cutters operating along the length and width sides are identical.

Thus, workpiece 2 may be moved in a simple manner on roller conveyor 20 through displaceable portal onto support table 1 until the workpiece abuts the stationary portal at the other end of the table. The workpiece may be aligned on the table symmetrically in respect of the longitudinal center line thereof by providing guide rails on both length sides of the tables, such guide rails being displaceable transversely thereof. Electric or hydraulic displacement means may drive these guide rails symmetrically towards the longitudinal center line. As soon as these guide rails have been moved towards each other so that the distance therebetween equals the width of the workpiece, the drive is discontinued because the workpiece is then aligned with respect to the center line. In this aligned position, supports 17 are raised to clamp workpiece 2 between the supports and abutments 16, the displaceable portal having been moved lengthwise to an extent depending on the length of the workpiece. The milling cutters are now set to grip the workpiece edges between rollers 24 and 26, the workpiece now being held immovably for the trimming and edge-cutting operation. After this operation has been completed, the grip of the workpiece edges is released, supports 17 are lowered to place the machined workpiece on roller conveyor 20, and the workpiece is removed from the table on the conveyor.

Figure 5:
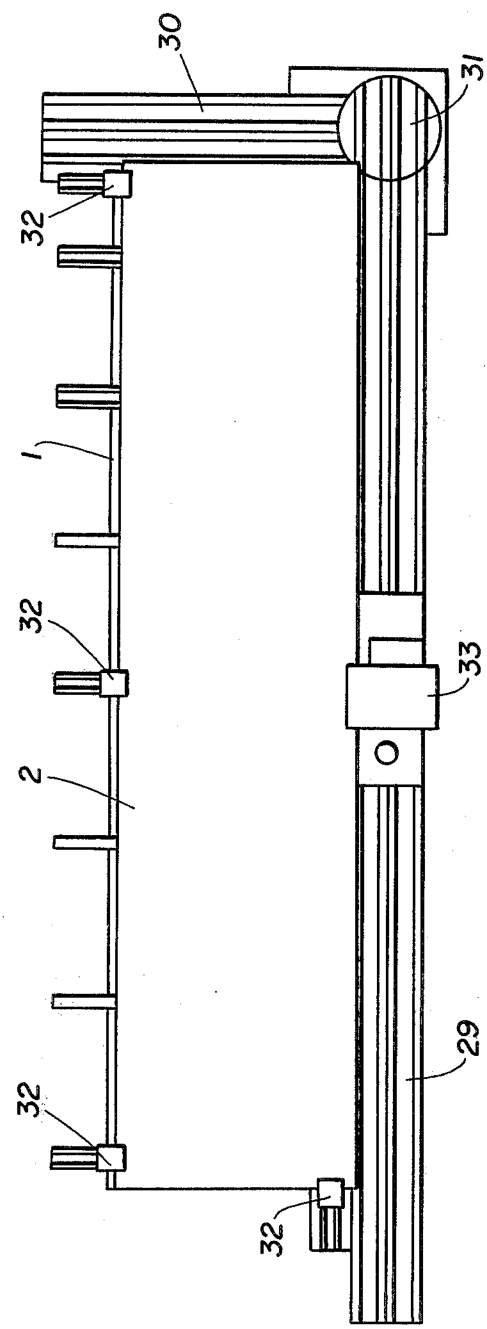
FIG. 5 is a top plan view of another embodiment of the apparatus.

The embodiment of FIG. 5 shows an arrangement enabling machining of two mutually perpendicular edges of a workpiece in an extremely simple manner. For this purpose, two guide tracks 29 and 30 extend at right angles to each other in one plane, the two tracks being interconnected by turnable 31. Workpiece 2 is held in position on support table 1 by clamping and aligning elements 32 which engage the free edges of the workpiece. A single milling cutter unit 33, which may be of the same design as the milling cutter unit hereinabove described, is guided along the tracks for work on the mutually perpendicular edges, the interconnecting turntable enabling the unit to be switched between tracks 29 and 30.

Figure 6:
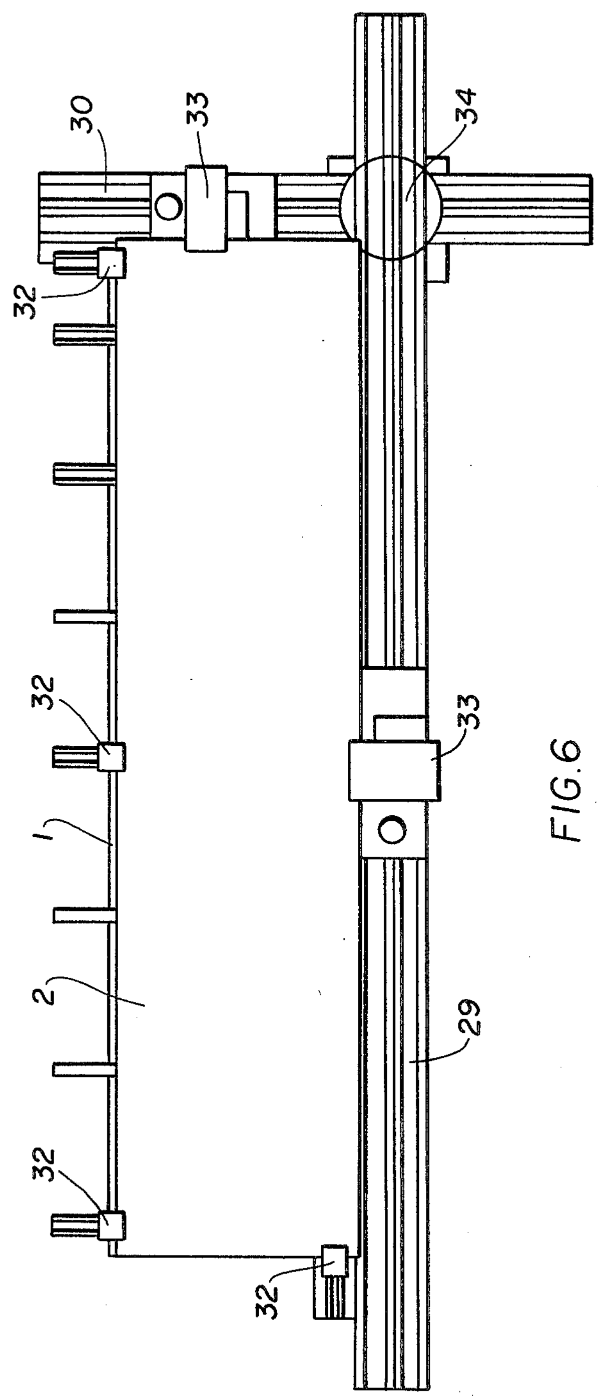
FIG. 6 is a like view of yet another embodiment.

In the modification of the above embodiment illustrated in FIG. 6, each of guide tracks 29 and 30 guides its own milling cutter unit 33. A turning switch 34 is arranged at the point of intersection of the two coplanar tracks to enable the units to be displaced along the respective track at this point. Since this arrangement enables both edges to be machined simultaneously, the work time is cut in half, as compared to that of the embodiment of FIG. 5, thus doubling the output.

Figure 7:
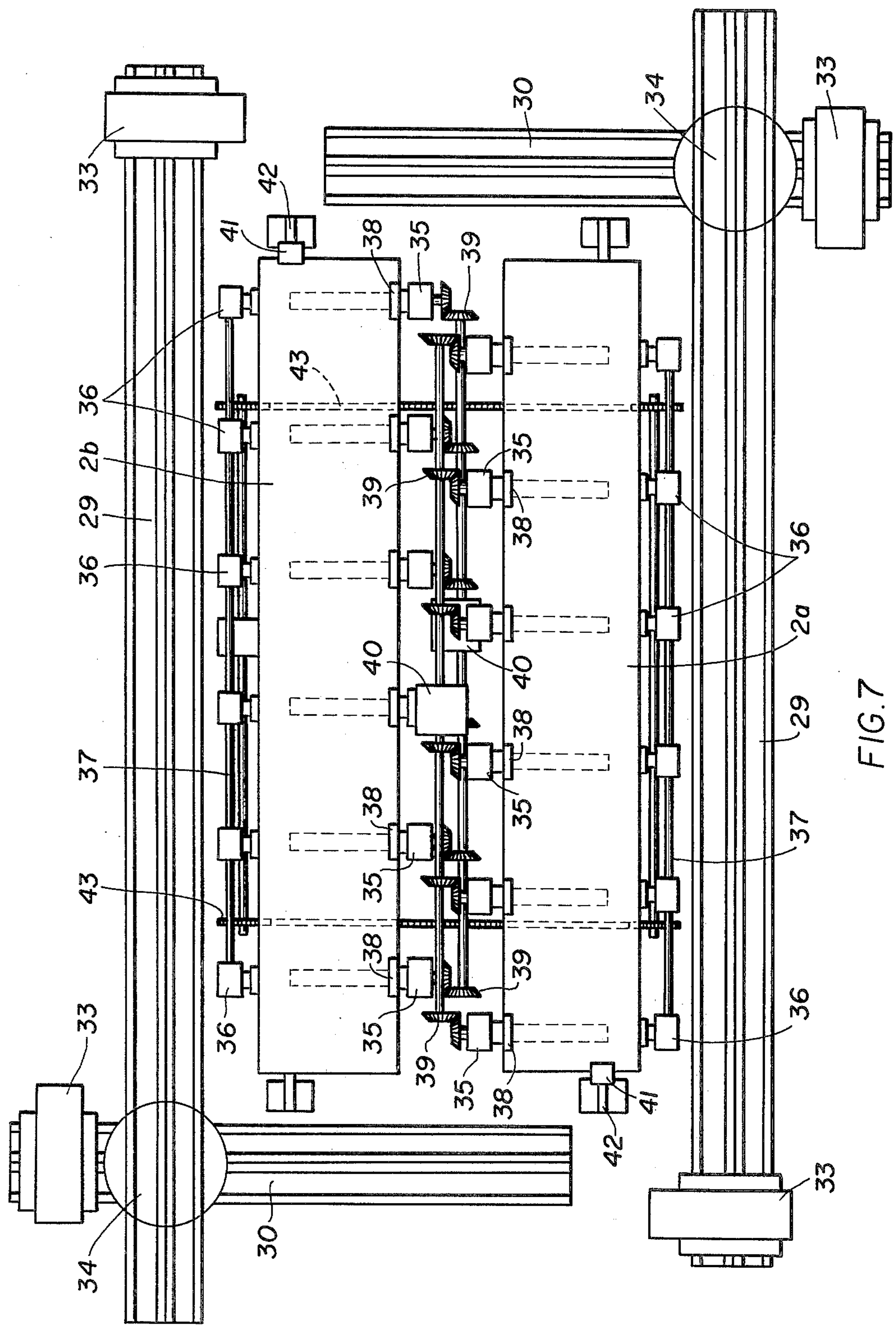
FIG. 7 is a top plan view of an embodiment combining the features of the embodiments of FIGS. 5 or 6.

Turning the workpiece for machining all four edges thereof may be avoided, in accordance with the embodiment shown in FIG. 7, by surrounding the support table by four guide tracks, respective pairs of guide tracks 29, 30 extending in one plane. This embodiment constitutes a mirror-image combination of two pairs of guide tracks as shown in FIG. 6, turning switch 34 interconnecting the guide tracks of each pair. Each guide track guides its own milling cutter unit 33 which is positioned at the end of its track in the rest position, these rest positions being outside the respective turning switches on widthwise tracks 30. For the sake of clarity of illustration, the support table surrounded by the four tracks is not shown in this figure.

The support table has a width at least twice the width of the workpiece to be supported thereon and, to make it possible to machine all four edges without turning the workpiece, means may be provided for moving the workpiece in the direction of the table width, the paths of delivery of the workpiece to the table and of removal thereof from the table being parallel to each other but offset by the distance of widthwise movement of the workpiece on the table by the moving means.

Thus, the workpiece may be transported into the working position on the table by one roller conveyor, clamped in position on the table with one of the length and width sides of the workpiece associated with a respective pair of guide tracks 29,30, and after the edges have been machined, the workpiece is moved widthwise into association with the other pair of guide tracks for machining of the two other edges, whereupon it is removed from the table on another roller conveyor parallel to the delivery conveyor but widthwise offset therefrom. While the workpiece is in its second working position, another workpiece may be conveyed into the first position so that work is simultaneously effected on two workpieces.

As shown in FIG. 7, the incoming workpiece 2*a* is positioned on the table by a series of aligning blocks 35 distributed equidistantly over the length of the table and facing associated abutments 36 against which the aligning blocks press the workpiece to hold it in a position predetermined by the rectilinear alignment of abutments 36. The abutments are mounted on a common shaft 37 which is rotatable to permit the abutments to be raised into and out of their working position in the plane of the table so that they do not interfere with the milling operation subsequent to the positioning of the workpiece, during which operation the workpiece is clamped in position by means such as previously described. Each aligning block carries clamp 38 which holds the workpiece on the table after it has been aligned. Aligning blocks 35 may be moved synchronously by drives 39 operated by motor means 40 towards guide track 29. Additionally, a lengthwise moving aligning block 41 may be mounted on the table for positioning shorter workpieces.

After the workpiece has been machined in position 2*a*, it is moved into position 2*b*, i.e., from one length side of the table to its other length side. The diagrammatically illustrated moving means comprises chain drived 43, 43 extending in the direction of the table width. The chain drives are movable into and out of the plane of the table through slots therein, each drive having dogs engaging the workpiece for moving the same in this direction. While work is done in position 2*b* another workpiece is moved into position 2*a* so that work proceeds simultaneously in both positions.

The machines shown in FIGS. 5 to 7 require no workpiece sensing or centering means because these machines have fixed reference lines in respect of which the workpiece is aligned. Such machines are usefully provided with digital measuring devices which permit a rapid reading of the required extent of trimming.

Figure 8:
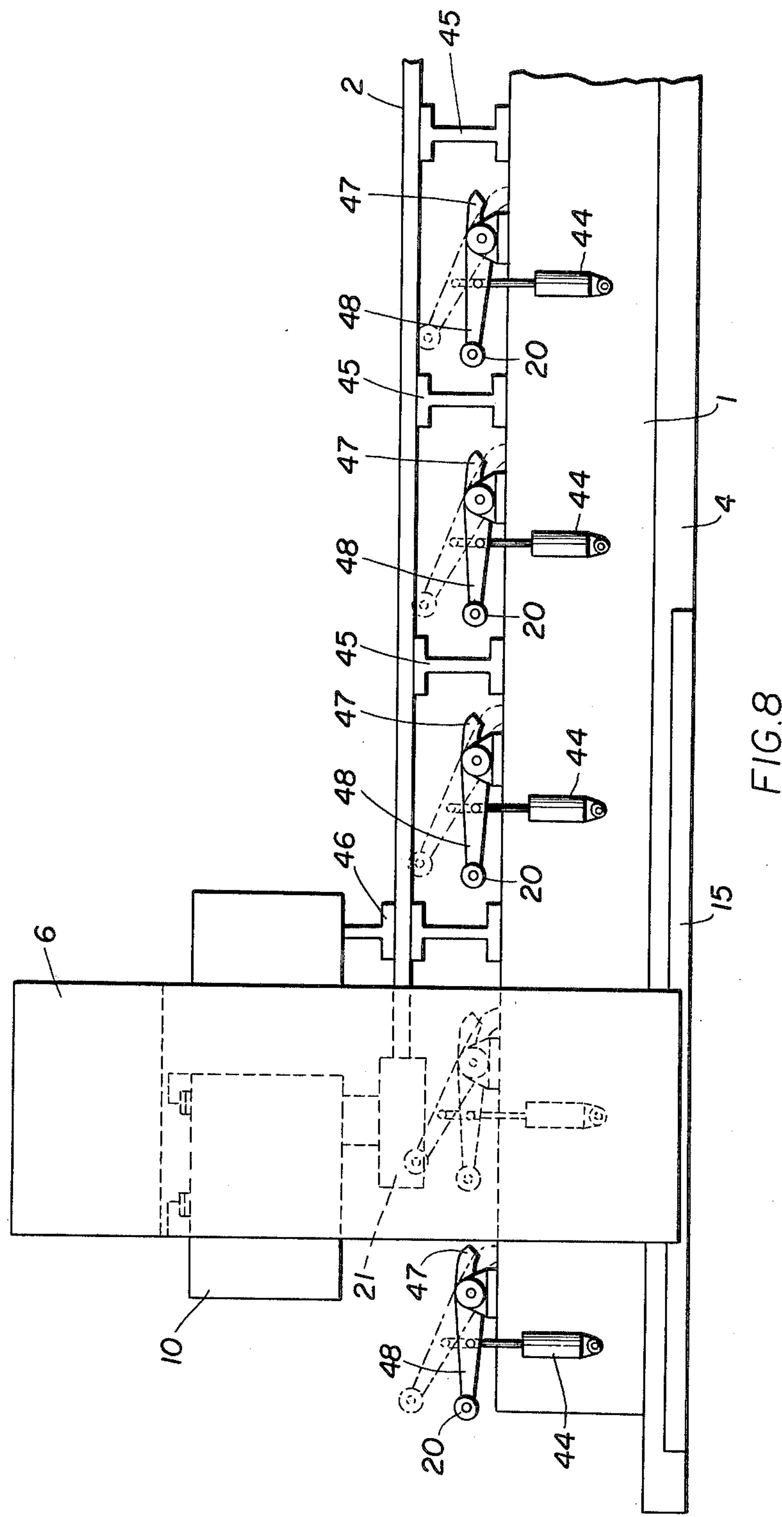
FIG. 8 is a schematic side elevational view of a workpiece support table with a vertically movable roller conveyor for the workpiece.

FIG. 8 shows a modification of the embodiment of FIGS. 1–4 wherein the rollers of roller conveyor 20 are vertically movable by hydraulic jacks 44 below and above the plane of working. When the rollers are lowered into the position shown in full lines from their raised position shown in broken lines, workpiece 2 is supported on crossbeams 45. At the ends of the workpiece, it is clamped to the crossbeams by hydraulically vertically movable pressure plates 46 mounted on sliding carrier 10 which is supported on portal 6. Clamped in the working position, the workpiece is machined along the edges whereafter the pressure plates and the rollers are raised to remove the workpiece from the table. The vertical movement of all the rollers of the conveyor between a transport position above the working plane and a position below this plane assures a relatively frictionless transport of the workpiece with minimum damage to its suface while assuring proper clamping thereof in the working position.

The stroke of hydraulic jacks 44 is limited by stops 47 formed on arms 48 which carry the rollers. To enable portal 6 to be used for workpieces of different lengths, crossbeams 45 are replaceably mounted in the range of the portal.

Figure 9:
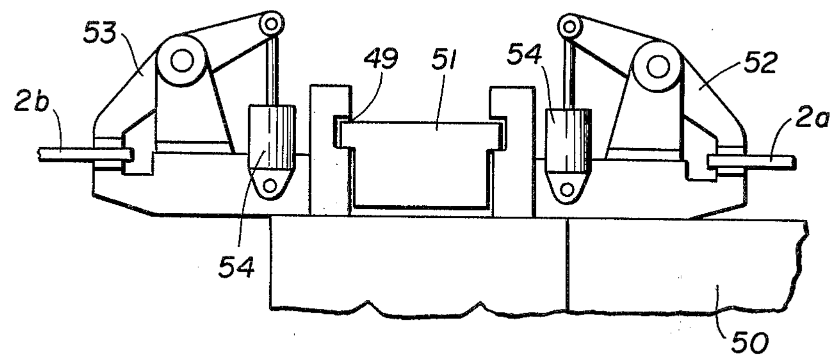
FIG. 9 is a front elevational view of a workpiece delivery and removal unit.
Figure 10:
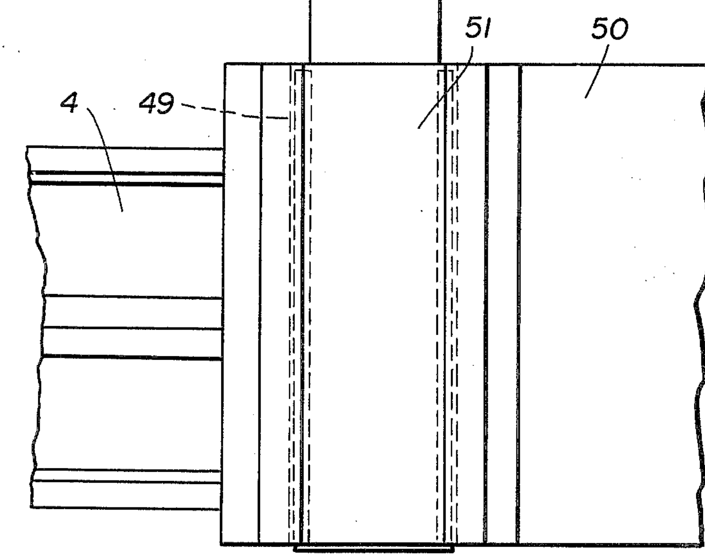
FIG. 10 is a top plan view of FIG. 9.

FIGS. 9 and 10 illustrate an arrangement for the easy delivery and removal of a workpiece. For this purpose, guideway 49 extending transversely of the guide track of a milling cutter unit 50 guides slidable boom 51. The boom may be moved towards and away from the table by a hydraulicn drive (not shown), FIG. 10 showing boom 51 in advanced position. The boom carries tow clamping elements 52, 53 operable by hydraulic jacks 54 to grip workpieces 2*a*, 2*b*, clamp 52 engaging the rear end of workpiece 2a which has been trimmed and clamp 53 engaging the front end of workpiece 2*b* to be trimmed. Thus, movement of the milling cutter unit along its guide track will simultaneously remove workpiece 2*a* and move workpiece 2*b* into working position. After milling cutter unit 50 has been returned to its starting position at the other end of the table, clamps 52 and 53 are opened and boom 51 is moved in again so that, upon the subsequent advancement of the milling cutter unit during the trimming operation in the opposite direction, the boom with its clamps may pass by workpiece 2*b* upon which the milling cutter unit now works. After this workpiece has been machined, the above procedure is repeated for removal of workpiece 2*b* and positioning of the next workpiece.

It is necessary for the workpiece to be properly aligned during the milling operation so that its length sides are parallel to the longitudinal axis or length sides of the support table. Also, since the width of successive workpieces may vary somewhat and it is useful to reduce the necessary trimming to a minimum, it is advantageous to distribute the total excess width equally along both length sides of the workpiece. For this purpose, the table has a transversely movable guide rail along each length side thereof and means is provided for moving the two guide rails symmetrically towards the longitudinal axis or center line of the table. During this symmetrical inward movement of the guide rails, the workpiece will be taken along and positioned symmetrically in respect of the table axis. Upon contact of both guide rails with the workpiece, the same is properly centered and aligned and further movement of the guide rails is stopped by means of a suitable trip switch or a friction coupling. The workpiece is then clamped on the table in this position for the subsequent milling operation.

The guide rails must be so arranged, of course, that they do not interfere with the work on the length sides of the workpiece. This is accomplished by mounting the guide rails for vertical movement out of the transport and working plane or by moving the guide rails apart again in those embodiments wherein the workpiece is raised from a transport into a working plane.

Figure 11:
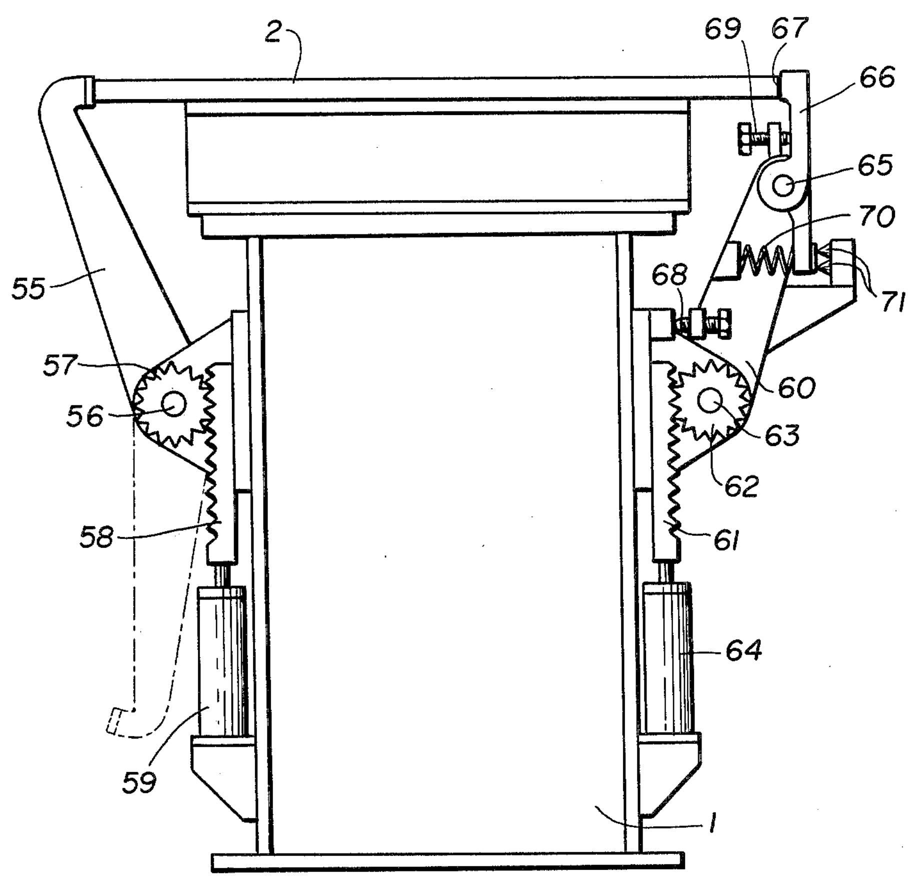
FIG. 11 is a front elevational view of a workpiece support table with means for aligning the workpiece thereon.

However, if the workpiece edges are not rectilinear, i.e., where they have the shape of a sword edge, alignment and centering by means of a pair of symmetrically inwardly moving guide rails is not possible. For this purpose and as shown in FIG. 11, a plurality of levers 60 are distributed along the length sides of the table, the levers being pivotal in respective planes parallel to the width sides of table 1. First adjustable abutment means 68 limit the upward pivotal stroke of the levers, and sensing levers 66 are mounted on respective ones of levers 60. Each sensing lever has a bearing surface 67 for contact with adjacent ones of the edges of workpiece 2 supported on the table. Second adjustable abutment means 69 limit the upward pivotal stroke of the sensing levers to hold the same in a base position and springs 70 bias the sensing levers against the abutments 69 whose adjustment pivots the sensing levers away from table 1 against the bias of springs 70. Control switches 71, 72 are actuated by sensing levers 66 in their base position. Two pairs of workpiece aligning levers 55 are mounted on the table, the levers of each pair being pivotal towards each other in the direction of the width sides of the table for gripping the workpiece therebetween in response to the actuation of the control switches, the aligning levers being either individually pivoted or in unison symmetrically in respect of the longitudinal center line of table 1.

The base position of the sensing levers is so adjusted by adjustment of abutments 69 that their bearing surfaces 67 define the rectangle determined by the desired dimension of the workpiece. The workpiece is then moved on the table until its edges lie completely outside the rectangle defined by bearing surfaces 67. In this manner, the workpiece will be accurately machined along its entire periphery.

For the sake of clarity of illustration, only one of one of the pairs of aligning levers 55 is shown in FIG. 11, two such lever pairs being mounted along the length sides of the table for gripping the respective ends of workpiece 2. The non-illustrated lever is arranged symmetrically in a mirror image of illustrated lever 55. The aligning levers are pivotal about pivots 56 extending parallel to the longitudinal axis of table 1 for contacting engagement with the length sides of workpiece 2. Pivoting of the levers is effected by means of pinion 57 meshing with rack 58 which is vertically reciprocable by hydraulic jack 59. When all the jacks are operated simultaneously to pivot the levers 55 from their lowered position shown in broken lines to their operating position shown in full lines, the workpiece will be laterally moved until all four levers contact the edges of workpiece 2. Since the levers move symmetrically towards the center line of the table, the workpiece will then be coarsely centered in respect thereto and pivoting of the aligning levers is discontinued.

However, when the workpiece edges are not rectilinear, such alignment is not sufficient because, if the edges have the shape of a sword edge, for instance, portions thereof would not lie within range of the milling cutters. To avoid such misalignment, levers 60 are now pivoted upwardly by operation of hydraulic jacks 64 carrying vertically reciprocable racks 61 meshing with pinions 62. Again, for sake of clarity of illustration, only one lever 60 of one pair of the plurality of levers is shown, the other lever of each pair again being arranged symmetrically on the other side of the table.

The illustrated abutment means 68 and 69 are set screws in contact with levers 60 and 66, respectively, which enable the bearing surfaces 67 to be adjusted accurately to the desired peripheral dimension.

When a sensing lever is prevented from further pivoting by the adjusted abutment means before its bearing surface 67 contacts the edge of workpiece 2, the latter must be further moved laterally since it will otherwise not be trimmed to the desired dimension at this point. Therefore, when the sensing lever engages abutment 69, it opeates control switch 71, 72 actuating the pivoting of aligning levers 55 so that the workpiece is properly centered. This further movement of the workpiece will cause the sensing lever to be removed from its abutment, thus stopping further pivoting of the alignment levers and movement of the workpiece. When the control switches of all sensing levers mounted along the two sides of the workpiece are open, the rectangle defining the desired size of the workpiece is wholly within the circumference of the workpiece, and the machining thereof can begin after the workpiece has been clamped into position.

As shown, sensing levers 66 are biased against adjustable abutments 69 by springs 70 and may be pivoted out of this base position delimited by the adjustment of the abutments against the bias of springs 70 by the lateral movement of workpiece 2. Upon such pivoting, the control switch is opened, i.e., contact plate 72 mounted on sensing lever 66 is removed from the pair of contacts 71 mounted on lever 60. In the base position of the sensing lever, the control switch is closed and operates hydraulic jack 59 for pivoting one of the aligning levers 55 on the opposite side of the table so that the workpiece is laterally moved towards bearing surface 67 of this sensing lever, thus pivoting it out of its base position, opening the switch and discontinuing the pivoting movement of the opposite aligning lever. The workpiece is thus moved until all control switches are open. After this centering operation, the levers 55 and 60 may be pivoted downwardly below the table plane so as to make room for the milling cutter units.

What is claimed is:

1. Apparatus for trimming and edge cutting a plate-like metallic workpiece having a major face and a plurality of edges narrower than said major face and bounding the same, comprising:

a. a base;

b. a first, straight, elongated guide track fixedly mounted on said base;

c. supporting means on said base for supporting said workpiece in a position in which said face extends in a predetermined plane parallel to said first guide track;

d. a second straight guide track fixedly mounted on said base, said second guide track being elongated at right angles to said first guide track and parallel to said plane;

e. interconnecting means interconnecting said first and second guide tracks in a common plane, said interconnecting means including a turntable;

f. at least one milling cutter unit, said at least one unit including 1. a carrier, 2. engagement means shaped for engagement with each of said first and second guide tracks on said carrier engagement with at least one said guide tracks for longitudinally guided movement of said at least one unit on the engaged guide track, 3. a milling cutter, 4. guide means for guiding said milling cutter on said cutter transversely to the direction of elongated of the engaged guide track toward and away form an edge of said workpiece.

2. Apparatus of claim 1, wherein said first and second guide tracks intersect each other and are interconnected by said interconnecting means at the intersection thereof, said interconnecting means including switch means engageable with said engagement means for guiding said at least one cutter unit through said intersection in the direction of elongation of said one guide track.

3. Apparatus of claim 2, further comprising a second milling cutter unit including a second carrier, engagement means on said second carrier engageable with said second guide track for longitudinally guided movement of said second unit on the engaged second guide track while said one cutter unit is being guided on said first guide track, a second milling cutter, and guide means on said second carrier for guiding said second milling cutter transversely to the direction of elongation of the engaged second guide track, said switch means being movable for alternatively guiding said one cutter unit through said intersection in the direction of elongation of said first guide track and for guiding said second cutter unit through said intersection in the direction of elongation of said second guide track.

4. Apparatus for trimming and edge cutting a plate-like metallic workpiece having a major face and a plurality of edges narrower then said major face and bounding the same, comprising;

a. a base having two parallel length sides and two parallel width sides perpendicular to the length sides;
b. a plurality of levers distributed along the length sides and pivotal in respective planes parallel to the width sides;
c. first adjustable abutment means for limiting the upward pivotal stroke of the levers;
d. sensing levers mounted on respective one of the plurality of levers,
   1. each sensing lever having a bearing surface for contact with adjacent ones of the edges of the workpiece supported on the base;
e. second adjustable abutment means for limiting the upward pivotal stroke of the sending levers to hold the same in a base position;
f. spring means biasing the sensing levers against the second adjustable abutment means and adjustment of the second abutment means pivoting the sensing levers away from the base against the spring means bias;
g. control switch means actuated by the sensing levers in their base position;
h. two pairs of workpiece aligning levers, the aligning levers of each pair being pivotal towards each other in the direction of the width sides of the base for gripping the workpiece therebetween in response to the actuation of the control switch means;
i. a first straight, elongated guide track fixedly mounted on said base;
j. supporting means of said base for supporting said workpiece in a position in which said face extends in a predetermined plane parallel to said first guide track;
k. a second straight guide track mounted on said base, said second guide track being elongated at right angles to said first guide track and parallel to said plane; and
l. at least one milling cutter unit, said at least one unit including a carrier, engagement means on said carrier engageable with at least one said guide tracks for longitudinally guided movement of said at least one unit on the engaged guide track, a milling cutter, guide means for guiding said milling cutter on said carrier transversely to the direction of elongation of the engaged guide track toward and away from an edge of said workpiece.

5. Apparatus of claim 4 the control switch means controlling pivoting of individual ones of the aligning levers separately.

6. Apparatus for trimming and edge cutting a plate-like metallic workpiece having a major face and a plurality of edges narrower than said major face and bounding the same, comprising:

a. a base having two parallel length sides and two parallel width sides perpendicular to the length sides, the width sides of said base being at least twice the width of said workpiece;
b. a first and a second straight, elongated guide track fixedly mounted on said base, the second guide track being elongated at right angles to said first guide track;
c. a third and a fourth straight, elongated guide track fixedly mounted on said base, the fourth guide track being elongated at right angles to said third guide track, the first, second, third and fourth guide tracks extending in a common plane;
d. interconnecting means in said common plane interconnecting said first and second guide tracks, and said third and fourth guide tracks, respectively, each interconnecting means including a turning switch.
   1. one of said first and second tracks and said third track extending in the direction of said length sides, and the other one of said first and second tracks and said fourth track extending in the direction of said width sides;
e. supporting means on said base for supporting the workpiece in a position in which said face extends in a predetermined plane parallel to said common plane;
f. two milling cutter units, each of the units including
   1. a carrier,
   2. engagement means shaped for engagement with each of said first and second guide tracks and third and fourth guide tracks, respectively for longitudinally guided movement of each units on a respective one of the engaged tracks,
   3. a milling cutter, and
   4. guide means for guiding said milling cutter on said carrier transversely to the direction of elongation of the engaged guide track toward and away from an edge of said workpiece;
g. means for moving said workpiece in the direction of said width sides while supported by said supporting means, and
h. means for delivering a workpiece to said base in a delivery path and for removing the workpiece in a removal path, said paths being parallel to each other and transversely offset by the distance of widthwise movement of said workpiece by said moving means.

* * * * *